Oct. 4, 1960      R. B. WILLIAMS      2,955,252
COMBINATION ANALYZER-SAMPLER
Original Filed Sept. 10, 1956      2 Sheets-Sheet 1

INVENTOR.
ROLLIE B. WILLIAMS,
BY
ATTORNEY.

United States Patent Office 2,955,252
Patented Oct. 4, 1960

2,955,252

COMBINATION ANALYZER-SAMPLER

Rollie B. Williams, Baytown, Tex., assignor, by mesne assignments, to Esso Research and Engineering Company, Elizabeth, N.J., a corporation of Delaware Continuation of application Ser. No. 609,029, Sept. 10, 1956. This application Apr. 16, 1959, Ser. No. 806,839

11 Claims. (Cl. 324—.5)

This invention relates to a device for sampling and analyzing a body of liquid material. More particularly this invention relates to a combination sampling-analysis device comprising means for interrelating and controlling the sampling and analysis of a liquid material.

This invention is a continuation of R. B. Williams' application Ser. No. 609,029, filed September 10, 1956, (now abandoned) which application is a continuation-in-part of application Ser. No. 512,115 for Rhoderick K. Saunders and Rollie B. Williams, filed May 31, 1955.

It is frequently desirable for purposes of analysis to sample a liquid material (i.e., a material which is a liquid or which may be brought to a liquid condition by cooling, as in the case of gases, or by heating, as in the case of normally solid or highly viscous materials). It is also frequently desirable to conduct such an analysis by magnetic resonance spectroscopic means in that it is not necessary to destroy or contaminate the sample in order to obtain an analysis and in that useful information is frequently obtainable which is normally otherwise unobtainable or obtainable only with difficulty.

Accordingly, an object of the present invention is the provision of a device for sampling a body of liquid material and for analyzing the sample by magnetic resonance spectroscopic means.

Another object is the provision of means for sampling a body of liquid material, means for analyzing the sample to obtain a magnetic resonance signal and control means interconnecting the sampling means and analysis means for regulating the operation of the sampling and analysis means.

A further object is the provision of a continuous sampling and analysis device for monitoring the contents of a flowing liquid stream without destroying the sample obtained for monitoring purposes.

A still further object is the provision of a method for regulating the flow of a liquid material.

Still another object of the present invention is the provision of apparatus for regulating a treating process.

These and other objects are attained, in general, through the provision of magnetic resonance spectroscopic analysis means comprising means for analyzing a sample contained in a sample holder fluidly connected with a liquid material to be analyzed, control means for regulating the flow of a sample of said material through said sample holder, and regulating means interconnected with said control means and the analysis means of the magnetic resonance spectrometer for regulating the sampling of the said material and the analysis of the same.

In accordance with a preferred embodiment of the present invention, there is provided a magnetic resonance spectrometer comprising a sample holder and scanning means, a sampling line fluidly interconnecting the sample holder of the spectrometer with a body of liquid material for obtaining a sample of such material for analysis, sample control means for regulating the flow of material through said sampling line and said sample holder, magnetic resonance detecting means for obtaining a scanning signal in response to scanning operations and control means interconnecting the scanning means and the sample line control means for actuating the sample line control means in response to a scanning signal obtained by the detecting means.

The apparatus and process of the present invention may be practiced through the provision of a magnetic resonance spectrometer of any suitable construction such as a magnetic resonance spectrometer of the inductance type, the balanced bridge type, the oscillating detector type, etc. capable of obtaining a nuclear paramagnetic resonance signal (commonly referred to as a nuclear magnetic resonance signal), an electronic paramagnetic resonance signal (commonly referred to as a paramagnetic resonance signal), or both. In essence, all nuclear magnetic resonance spectrometers comprise (1) a large magnet for generating a unidirectional primary magnetic field, (2) a transmitter with coil means for generating a radio-frequency magnetic field at right angles to the primary magnetic field, (3) a sample holder, (4) an inductance coil coaxial with the sample holder for inductively obtaining a magnetic resonance signal, (5) a receiver for accepting the magnetic resonance signal produced at the sample location through a suitable coupling arrangement, and (6) suitable means for registering the magnetic resonance signal that is thus obtained.

Thus, in conducting a magnetic resonance spectroscopic analysis, a sample comprising a nuclear species may be placed in a sample holder surrounded by an inductance coil and members of the nuclear species may be polarized in a unidirectional primary magnetic field generated by a magnet, which primary field is crossed at right angles by a radio-frequency alternating magnetic field. The strength of the primary magnetic field, the frequency of the radio-frequency field, or both, may be changed so as to cause a scanning of the resonance band of the nuclear species to thereby cause a resonance precession of the nuclei of such nuclear species. The resonance precession of the nuclei may be inductively detected by the inductance coil surrounding the sample holder.

As indicated, in accordance with the present invention, the sample holder of a magnetic resonance spectrometer is fluidly connected by means of a sampling line with a body of liquid material. The sample line is provided with control means for regulating the flow of material therethrough. In addition, regulating means are provided for interconnecting the magnetic resonance spectroscopic analysis means with the sample line control means, such regulating means being of a construction such that scanning operations are regulated in response to the sampling operation. In accordance with one embodiment of the present invention, a body of material is periodically sampled and, in this situation, the regulating means is of a construction such that a scanning operation is conducted in response to a first sampling operation and such that a second sampling operation is conducted in response to the scanning operation.

The invention will be further illustrated by reference to the accompanying drawings wherein.

Throughout the specification and drawings, like numerals refer to like parts.

Figure 1:
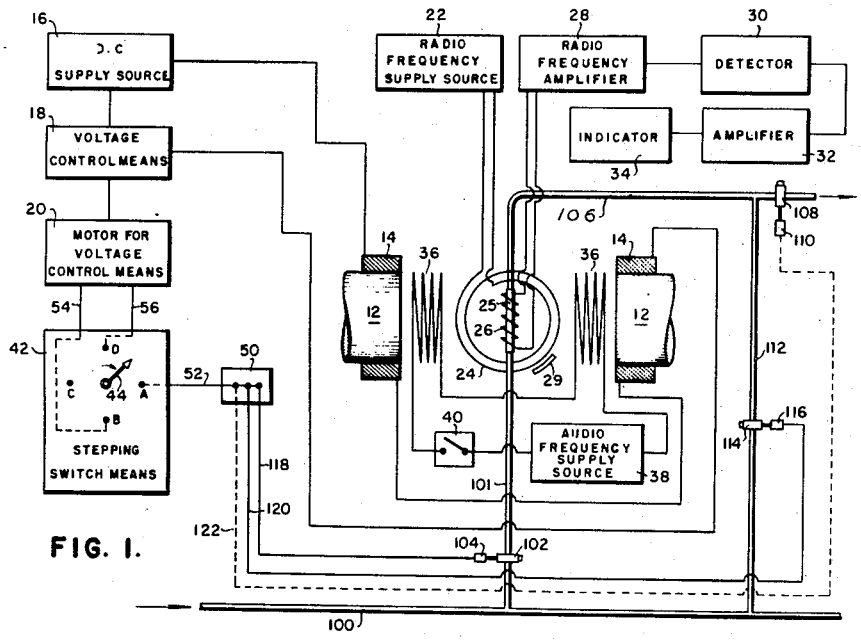
Fig. 1 is a schematic drawing of a combination sampling and magnetic resonance spectroscopic analyzing device of the present invention and of the wiring therefor.

Turning now to Fig. 1 there is schematically shown a magnetic resonance spectrometer of the inductance type. It will be understood, of course, that the magnetic resonance spectrometer may also be of a balanced bridge type, the oscillating detector type, etc. The inductance type spectrometer of Fig. 1 comprises an electromagnet containing magnet cores 12—12 surrounded by coils 14—14. A radio-frequency supply source 22 is provided for transmitting a radio-frequency signal through a transmission coil 24. A sample holder 25 surrounded by an inductance coil 26 is also provided. Suitable mode balancing means is provided, such as a flux paddle means 29 of the type disclosed in Bloch et al. Patent No. 2,561,489, for controlling leakage flux and for providing the proper phase relationship between the voltage induced by the precessing nuclear species and the voltage induced by the leakage flux, whereby a dispersion mode signal will be obtained when the leakage and dispersion mode voltages are in phase and whereby an absorption mode signal will be obtained when the leakage and absorption mode voltages are in phase. The inductance coil 26 is connected with suitable signal obtaining means such as, for example, a radio-frequency amplifier 28 which, in turn, is connected with a diode detector 30 for detecting the amplified radio-frequency signal from the amplifier 28. A second amplifier 32 for amplifying the signal detected by the diode detector 30 may also be provided, the amplifier 32 being connected with a signal indicator 34 of any suitable construction such as a cathode ray oscilloscope, a strip chart recorder, a peak reading voltmeter, etc.

Suitable means are provided for varying the strength of the primary magnetic field, the frequency of the radio-frequency magnetic field, or both. In the illustrated embodiment of the present invention, means of a suitable construction are shown for varying the primary magnetic field. It will be understood, of course, that if desired, the frequency of the radio-frequency field may be changed or that both the frequency of the radio-frequency field and the strength of the primary magnetic field may be changed, the specific control means illustrated in Fig. 1 being shown for purposes of illustration only.

In accordance with this showing, there is provided a direct current supply source 16 connected in series with the coils 14—14 for generating a primary magnetic field. There is also provided a suitable voltage control means 18 such as a potentiometer of the "Helipot" type which is provided with a motor 20, such as a servo-motor, for periodically reversing the direction of voltage change in response to signals obtained in a manner to be described.

It is also frequently desirable to provide means for modulating the primary magnetic field in the direction thereof with an audio-frequency magnetic field to thereby provide means, for example, for obtaining a more accurate analysis of a sample, for providing a sole or auxiliary means for conducting scanning operations, etc. Thus, there may be provided suitable coils 36—36 connected in series with an audio-frequency supply source 38 by a circuit including a switch member 40 for energizing the coils 36—36 when such is desired.

In accordance with the present invention, regulating means are provided for controlling scanning operations. Thus, in the illustrated embodiment of the present invention the controls for the motor 20 (which is preferably a servo-motor) are connected with and actuated by suitable switch means such as, for example, stepping switch means 42 for periodically actuating a rotatable contact member 44 to periodically close contacts A, B, C and D.

In accordance with this construction, the contact A is connected with a junction box 50 by means of a lead 52 for a purpose to be described.

Electrical connection 54 is provided for interconnecting the contact B with the control means (not shown) of the motor 20 to cause a change of voltage in a first direction to bring the nuclear magnetic resonance spectrometer to a condition of readiness preparatory to a subsequent scanning operation.

The contact C is a time delay contact which is preferably provided for a purpose to be described.

Contact D may be connected by means of a lead or connection 56 with the control means of the motor 20 to provide for a change of voltage in a second direction (opposite to the first direction) to cause scanning of the resonance band of a nuclear species in a sample contained in the sample holder 25.

Returning now to the sample holder 25, it will be noted that there is provided a sampling line 101 interconnecting the sample holder 25 with a conduit 100 containing a liquid material to be sampled, the sampling line 101 containing suitable flow control means such as an electrically operated normally closed valve 102 provided with actuating means 104 for controlling the same. There is also provided a sample discharge line 106 controlled by suitable means such as an electrically operated normally closed valve 108 provided with actuating means 110 for operating the same.

There may also be provided a return line 112 containing control means such as an electrically operated normally closed valve 114 controlled by actuating means 116 interconnecting the discharge line 106 with the flow line 100 downstream from the sampling line 101. In accordance with the present invention, a lead 118 from the junction box 50 is provided for interconnecting the actuating means 104 of the valve 102 with the contact A of the switch member 106. In similar fashion, a lead 120 may be provided for interconnecting the actuating means 116 for the valve 114 with the contact A. Alternately, there may be provided a lead 122 for connecting the actuating means 110 for the valve 108 with the contact A, as shown by the dotted line.

In operation, the contact member 44 of the stepping switch means 42 is rotated to periodically sequentially close contacts A, B, C, and D. When the siwtch member closes the contact A, an electrical signal is transmitted through the lead 52 to the junction box 50 and from thence through leads 118 and 120 to energize the actuating means 104 and 116 for opening normally closed valves 102 and 114 to thereby permit liquid to flow from the conduit 100 through the sample line 101 to the sample holder 25 and thence through the discharge line 106 and the return line 112 back to the conduit 100. (Alternately, the signals may be transmitted through the leads 118 and 122 to open normally closed valves 102 and 108 whereby the liquid material will flow through the conduit 100, through the sampling line 101 to the sample holder 25 and from thence will be discharged from the system by way of the line 106.) After a suitable time for complete flushing of the sample holder 25 has elapsed, the contact member 44 rotates to and closes the contact B. As a consequence, the valves 102 and 114 will return to their normally closed positions.

When the contact B is closed by the switch member 44, a signal is transmitted through the lead 54 to actuate the motor 20 to set the voltage control means 18 to a position of readiness for a subsequent scanning operation. This may be accomplished, for example, by changing the setting of the voltage control means from a previous voltage minimizing setting to a desired voltage maximizing setting, whereby during a subsequent scanning operation a progressive decrease in voltage can be utilized to cause a scanning of the resonance band of a nuclear species in the sample.

Thereafter, the contact member 44 rotates from contact B to close contact C. While the contact C is closed, the motor 20 and voltage control means 18 are idle. The contact C is preferably provided in that it is normally desirable to conduct nuclear magnetic resonance scanning operations while a sample is at rest, this being done to establish maximum polarization of nuclei of the molecules comprising the sample. Many liquids come to a condition of maximum polarization motion in a comparatively short period of time, such as the time required to bring the voltage control 18 to a position of readiness, as described above. However, by providing contact C, which functions as a time-delay device, it is possible to insure that the liquid in the sample holder 25 will come to rest and without fluid motion. It is seen, therefore, that in many situations the contact C may be eliminated, if desired, but that it is preferably provided as at least a precautionary measure. When contact C is provided, it is closed by the contact member 44 for a period of time sufficient to bring the sample in the sample holder 25 to a condition of quiescence.

Thereafter, the contact member 44 rotates to close the contact D whereby a signal is transmitted through the lead 56 to actuate the motor 20 and voltage control means 18 to bring about a scanning operation. This may be accomplished, for example, by progressively decreasing the voltage passing from the voltage control means 18 to the direct current supply source 16, whereby the strength of the primary magnetic field generated between the cores 12—12 is progressively decreased, whereby the requisite correlation of the primary field strength with the frequency of the R.F. field will be established to cause resonance precession of a nuclear species in the sample as the resonance band of such nuclear species is magnetically traversed during the scanning operation.

For example, the material flowing through the conduit 100 may be an organic compound, such as a hydrocarbon, and it may be desired to determine the hydrogen content of the organic compound. In this situation, hydrogen will be the selected nuclear species. Resonance precession of the nuclear species as the resonance band is scanned will cause a voltage to be induced in the coil 26 which is amplified by the radio-frequency amplifier 28.

A nuclear magnetic resonance signal is obtained through the provision of a detector 30 connected with the radio-frequency amplifier 28, which nuclear magnetic resonance signal is amplified by the amplifier 32 and transmitted to an indicator 34 of any suitable construction such as a cathode ray oscilloscope, a strip chart recorder, a voltmeter, etc.

On completion of scanning operations, the contact arm 44 is actuated to again rotate to contact A whereby the just-described cycle of operations will be repeated.

The characteristics of the nuclear magnetic resonance signal will depend upon the manner in which the nuclear magnetic resonance spectrometer is operated. Thus, an absorption type signal or dispersion type signal may be obtained, depending on the position of the paddle means 29. The manner in which these signals are obtained is well known to those skilled in the art and has been described in many publications including, by way of illustration only, articles such as "Magnetic Resonance" (K. K. Darrow, Bell System Technology Journal, vol. 32, pages 74–79 and 384–405, 1953), "Nuclear Magnetism" (Felix Bloch, American Scientist, vol. 43, Jan. 1955, pages 48–62), "Fundamentals of Nuclear Magnetic Adsorption" (G. E. Pake, American Journal of Physics, vol. 18, No. 7, 1950, pages 438–452 and vol. 18, No. 8, 1950, pages 473–486), etc.

If, for example, it is desired to quantitatively determine the hydrogen content of the sample in the sample holder 25, an analysis method of the type disclosed in the aforesaid Saunders et al. application Ser. No. 512,115 may be employed. Alternately, there may be employed an analysis technique of the type disclosed in Williams application S. N. 609,030, filed September 10, 1956, a continuation-in-part of said application Ser. No. 512,115. In either case a dispersion signal will be obtained having a maximum intensity constituting a measure of the quantity of hydrogen in the sample.

It is seen from the foregoing that through the provision of the apparatus of the present invention it is possible to periodically monitor the contents of a flowing stream of material in a conduit.

Monitoring of a conduit can be particularly advantageous and especially so when the conduit is a pipeline for delivering petroleum hydrocarbon products to a receiving station. For example, if the material in the conduit 100 of Fig. 1 is a charge of gasoline in a pipeline which is to be followed by a charge of kerosene, the difference in the hydrogen content of the gasoline, as compared with the hydrogen content of the kerosene, may be detected in accordance with the present invention. As a consequence, the routing of the gasoline and kerosene at a receiving station (not shown) may be regulated in response to analysis to prevent the two materials from being mixed at the receiving station. This may be accomplished, in general, by electrically interconnecting the indicator 34 of Fig. 1 with shiftable actuating means (not shown) for a flow control device. One manner in which such an electrical connection may be established will be subsequently described in greater detail in connection with Fig. 3.

Figure 2:
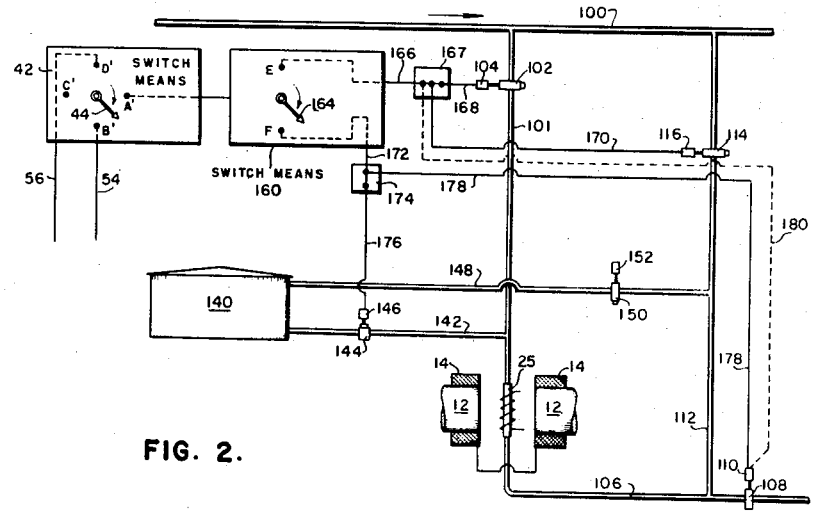
Fig. 2 is a fragmentary schematic drawing illustrating another embodiment of the present invention.

It is sometimes desirable to have liquids from a plurality of different sources flow through a single sample holder of a nuclear magnetic resonance spectrometer. Apparatus for accomplishing this purpose is schematically shown in Fig. 2. The apparatus of Fig. 2 comprises a nuclear magnetic resonance spectrometer which may be similar to the spectrometer shown in Fig. 1. Accordingly, in order to simplify Fig. 2, only the pole pieces 12—12, the coils 14—14 and the sample holder 25 of the spectrometer of Fig. 1 have been shown.

In Fig. 2 there is shown, in addition to the conduit 100, a storage tank 140 containing a liquid which is specifically different from the liquid flowing through the line 100 but which preferably contains a nuclear species in common with the liquid in the line 100. The storage tank 140 is connected with the sampling line 101 for the sample holder 25 by a discharge line 142 having an electrically operated normally closed valve 144 controlled by actuating means 146. A line 148 from the branch line 112 returns to the storage tank 140, line 148 having an electrically operated, normally closed valve 150 interposed therein which may be opened by actuating means 152.

In accordance with this modification there is shown, in addition to the stepping switch means 42 of Fig. 1, a second stepping switch means 160 containing contacts E and F to be periodically closed by a rotatable contact arm 164.

A lead 166 connects the contact E with a junction box 167 containing electrical leads 168 and 170 for the actuating means 104 for the valve 102 in the line 101 and for the actuating means 116 for the valve 114 in the return line 112. A lead 172 connects contact F with a junction box 174 containing electrical leads 176 and 178 for the actuating means 146 for the valve 144 in the line 142 and the actuating means 110 for the valve 108 in the line 106. If desired, there may be provided, as an alternative, a lead 180 (shown by the dotted line) for interconnecting the junction box 167 with the actuating means 110 for the valve 108, in which case the lead 170 would be disconnected to provide for simultaneous operation of the valves 102 and 108 rather than the valves 102 and 114. During the following discussion of operations it will be assumed that the valve 150 is inactive although it will be understood that, if desired, the valve 150 may be active and the valve 108 inactive.

In operation, it may be considered that the contact arm 44 is at contact D, that scanning operations have been completed by the nuclear magnetic resonance spectrometer and that all of the valves in the system are closed. After a suitable interval of time has elapsed and a next sampling operation is to be initiated, the contact arm 44 rotates to close contact A. When contact A is closed a signal is transmitted to the second switch means 160 to move the contact arm 164 to close contact E. As a result, a signal is transmitted through the lead 166 to the junction box 167 and from thence through the leads 168 and 170 to the actuating means 104 and 116 to open the valves 102 and 114 whereby a portion of the liquid flowing through the conduit 100 is caused to flow through the line 101 to the sample holder 25 of the nuclear magnetic resonance spectrometer and from thence through the discharge line 106 and the return line 112 back to the conduit 100. After a sufficient time has elapsed to thoroughly flush the sample holder 25 the switch member 44 is actuated to rotate to and close contact B whereby the valves 102 and 114 will be returned to their normally closed position and whereby the nuclear magnetic resonance spectrometer will be brought to a condition of readiness in the manner described with respect to Fig. 1 by the transmission of a signal from the contact B through the lead 54. Thereafter, the contact arm 44 rotates to contacts C and D in the described manner, whereby an analysis for a nuclear species in the liquid flowing through the conduit 100 is obtained.

After scanning operations have been completed, the contact arm 44 again rotates to contact A. As a result, a second signal is transmitted to the second switch means 160 and, in response to this second signal, the contact arm 164 rotates to and closes contact F. When the contact F is closed, a signal is transmitted through lead 172 to the junction box 174 and from thence through the leads 176 and 178 to open the valves 108 and 144 in the described manner whereby the liquid contained in the storage tank 140 will be caused to flow through the lines 142 and 101 to the sample holder 25 of the nuclear magnetic resonance spectrometer. The liquid material contained in the storage tank 140 may, for example, be a liquid to be used as a standard of reference which contains a known quantity of the nuclear species or may be a liquid to be used for a different purpose as will be hereinafter explained. The liquid material flowing to the sample holder 25 from the storage tank 140 is discharged therefrom through the line 106.

After flow has continued for a time sufficient to thoroughly flush the sample holder 25, the contact arm 44 rotates to periodically close contacts B, C and D in the described manner.

After a suitable time has elapsed, the contact member 44 will again close contact A whereby a signal will be transmitted to the second switch means 160 to rotate the contact member 164 to contact E. The just-described sequence of operations will then be repeated.

It will be understood that additional bodies of liquid material (not shown) may be sampled and analyzed in the manner described in connection with Fig. 2 through the provision, for example, of additional leads (not shown) leading from the junction box 167 to control means (not shown) for additional sampling lines (not shown) fluidly interconnecting such additional bodies with the sample holder 25.

Many advantages are obtained through the provision of apparatus of the character described. Thus, as indicated, a liquid material may be periodically sampled and the samples analyzed with respect to a nuclear species contained therein without destruction of sample.

In accordance with a modified form of the present invention, a treating process such as a petroleum hydrocarbon refining process, a chemical reaction process, etc. is regulated by nuclear magnetic resonance means of the present invention. It will frequently happen that a characteristic of a nuclear species, such as the content of the nuclear species in a discharge stream from a treating zone will be indicative of the effectiveness of treatment accomplished by a treating process in the treating zone and that the effectiveness of treatment may be regulated in response to a determination of the content of such a nuclear species in such a discharge stream.

Illustrative chemical and refinery processes that may be regulated in this fashion include Fischer-Tropsch synthesis reactions, hydrogen treating reactions such as hydrogenation, hydroforming, autofining, hydrofining, hydrogen finishing, etc. reactions (either thermal or catalytic), alkylation reactions, sulfonation reactions, catalytic and thermal cracking reactions, solvent extraction processes, fractional distillation processes, fractional crystallization processes, etc.

Figure 3:
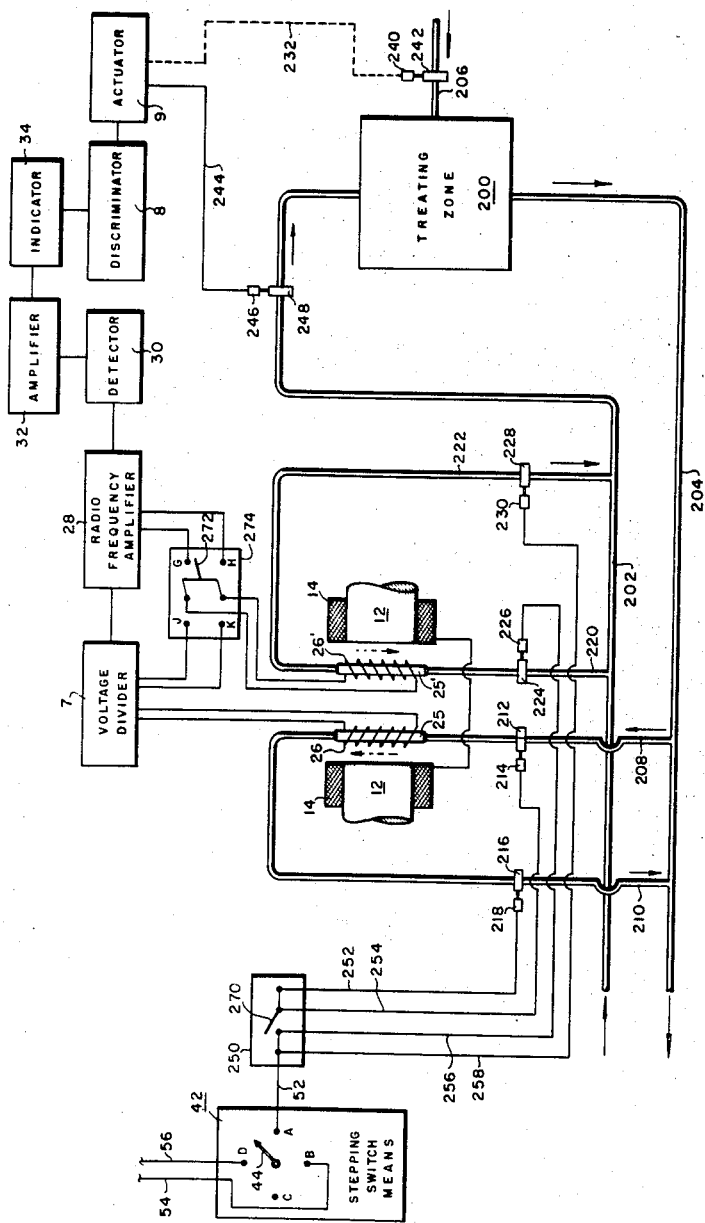
Fig. 3 is a fragmentary schematic drawing illustrating a further embodiment of the present invention.

The manner in which this can be accomplished is schematically illustrated in Fig. 3. In Fig. 3 there is schematically shown a treating zone 200 in which a treating process is conducted, the illustrated treating zone 200 having at least an inlet line 202 and an outlet line 204. Additional inlet lines, outlet lines or both, such as for example, an inlet line 206 may also be provided. For purposes of the present discussion it may be assumed that a liquid material to be treated is charged to the treating zone 200 through the line 202, that a second material to be utilized in the treating zone 200 is charged thereto through the line 206 and that a liquid stream is discharged from the zone 200 through the line 204. It may also be assumed, for purposes of the present discussion, that the product stream in the line 204 contains a nuclear species in an amount indicative of the effectiveness of treatment accomplished in the treating zone 200.

In accordance with the present invention, there is provided a nuclear magnetic resonance spectrometer of any suitable construction, such as shown in Fig. 1. In order to simplify the drawing of Fig. 3, only a portion of a nuclear magnetic resonance spectrometer has been shown, the illustrated portion consisting of the electromagnet comprising spaced cores 12—12 surrounded by coils 14—14.

At least one body of liquid material of the treating process (i.e., a body of liquid in an inlet line or an outlet line or a body of liquid present in the treating zone) is interconnected with the sample holder of a nuclear magnetic resonance spectrometer. Thus, for example, the outlet line 204 may be provided with a branch line 208 leading to a sample holder 25 and with a return line 210 leading back from the sample holder 25 to the line 204, the lines 208 and 210 containing suitable flow-control means such as normally closed, electrically actuatable valves 212 and 216 controlled by actuating means 214 and 218, respectively.

It may be desirable to employ a nuclear magnetic resonance spectrometer containing two sample holders, for a purpose to be described such as, for example, a spectrometer constructed in the manner described and claimed in copending Williams application Ser. No. 609,031, filed September 10, 1956 (a continuation-in-part of said Saunders et al. application Ser. No. 512,115). When such is the case, there is provided an additional sample holder 25' interconnected with another liquid body of the treating process such as, for example, the liquid material in the inlet line 202. The interconnection may be accomplished, for example, by means of a second branch line 220 leading from the line 202 to the sample holder 25' and a second return line 222 leading from the second sample holder 25' back to the line 202, the lines 220 and 222 being provided with suitable control means such as normally closed electrically actuatable valves 224 and 228 controlled by actuators 226 and 230, respectively.

In accordance with this showing, the sample holders 25 and 25' are surrounded by inductance coils 26 and 26', respectively. The inductance coils 26 and 26' are preferably wound in opposite directions so that the signals induced therein will be in phase opposition, as shown by the arrows.

As is more fully described in said copending application Ser. No. 609,031, when a pair of sample holders 25—25' are surrounded by a pair of oppositely wound inductance coils 26—26', such inductance coils 26—26' are preferably connected in series (e.g., through the provision of a double-pole switch 274) with a suitable voltage divider 7 for detecting the difference between the voltage of the signal induced in the coil 26 and the voltage of the signal induced in the coil 26'. The thus detected differential may then be amplified by a radio-frequency amplifier 28 connected with a detector 30 which, in turn, is connected wtih a suitable amplifier leading to a signal indicator 34. In accordance with the present invention, the output signal from the indicator 34 is passed into a discriminating means 8 of any suitable construction capable of transmitting a transmitter signal if the receiver signal from the indicator 34 is outside of a predetermined acceptable range. The discriminating signal is transmitted to an actuator 9 capable of energizing a suitable control means in response to such discriminator signal.

As a specific example, when the nuclear magnetic resonance spectrometer is operated in the manner disclosed in said Saunders et al. application S.N. 512,115, or in the manner disclosed in Williams application S.N. 609,030, filed September 10, 1956 (a continuation-in-part of said Saunders et al. application S.N. 512,115) and when the signal indicator 34 is of a construction to transmit a receiver signal responsive to the maximum voltage transmitted thereto from the amplifier 32 (i.e., a peak reading voltmeter) there is obtained a signal having a maximum intensity constituting a direct measure of the quantity of a nuclear species in a sample under investigation.

Thus, for example, the actuator 9 may be provided with an output electrical connection 244 connected with actuating means 246 for an electrically operated valve 248 in conduit 202 whereby flow through the conduit 202 may be regulated in response to the sampling-analysis process described above.

Alternately, as shown by the dotted line 232, there may be an electrical connection leading from the actuator 9 to a control means 240 for a valve 242 in another conduit 206 whereby, and in a proper situation, sampling and analysis of the material in the conduit 202 may provide the information necessary for the regulation of the flow of a fluent material through the conduit 206. As an example of such a situation, the conduit 202 may be a conduit leading to the treating zone 200, the conduit 206 may represent a second conduit leading to the treating zone 200. In a situation wherein the content of a nuclear species (e.g., hydrogen) in a discharge stream (e.g., a hydrocarbon stream) leading from the treating zone constitutes a measure of the effectiveness of the treating process and wherein the flow of a fluent material (e.g., a feed stock, reactant, reagent, etc.) may be regulated to control a process variable, sampling and analysis of the material in the discharge conduit 204 will provide a measure of the effectiveness of treatment and, if the degree of treatment is unsatisfactory for a desired purpose, the treating conditions may be altered in response to a magnetic resonance signal obtained in the described manner which is transmitted from the indicator 34 by way of the discriminator 8 and actuator 9 through the electrical connection 244, whereby the control means 246 may be energized to vary the setting of valve 248, whereby treating conditions may be changed to compensate for the treating deficiency.

Suitable means of the type disclosed in Fig. 1 are also provided for regulating the valves 212, 216, 224 and 228 in the lines 208, 210, 220 and 222. Thus, there may be provided a lead interconnecting the contact A of the stepping switch means 42 with a suitable junction box 250 provided with leads 252, 254, 256 and 258 leading respectively to the control means 218, 214, 226 and 230 with valves 216, 212, 224 and 228. The switch box 250 may also be provided with a switch 270 for disconnecting the leads 252 and 254 when desired.

In conducting operations it may first be assumed that only a single sample holder such as the sample holder 25' is to be employed. In this situation, the switch 270 of the switch box 250 is disconnected whereby the valves 212 and 216 will remain closed. Also, the double-pole switch 272 is connected with contacts G and H to bypass voltage divider 7.

In this situation, sampling and analysis operations may be conducted in substantially the manner described and disclosed in connection with Fig. 1.

Through the provision of the detector 30 and amplifier 32, a suitable signal responsive to precession of a nuclear species of the sample in the sample holder 25 is fed to the indicator 34 and from thence to the discriminator 8. If the signal fed to the discriminator 8 is outside of a predetermined voltage range, a signal is transmitted from the discriminator 8 to the actuator 9 and from the actuator 9 to suitable process control means. Thus, the signal may be transmitted from the actuator 9 through a lead 244 to the actuating means 246 for the electrically operated valve 248 in the line 202.

It will frequently happen that two flow lines of a treating process will contain a common nuclear species. For example, a nuclear species charged to the treating zone 200 through the line 202 may be present in the product discharged therefrom through the line 204. In such a situation it is frequently desirable to regulate treating operations by comparing the nuclear species content of the line 202 with the nuclear species content of the line 204. When such is the case, the switch 270 of the switch box 250 is closed and the switch 272 of the double-pole switch 274 is connected with the contacts J and K leading to the voltage divider 7.

In this situation, a signal transmitted from the contact A of the stepping switch means 42 through the lead 52 to the switch box 250 will cause the simultaneous transmittal of signals through the leads 252 to 258 to actuate the valves 214, 216, 224 and 228 whereby a sample of the material in the line 202 will be delivered to the sample holder 25' and whereby a sample of the material in the line 204 will be delivered to the sample holder 25. When the switch arm 44 moves from the contact A the valves 214, 216, 224 and 228 will be closed whereby, on further rotation of the switch arm 44, the contacts B, C and D will be progressively closed. On closure of the contact D, the resonance band of the nuclear species common to the samples in the sample holders 25 and 25' will be scanned and signals in phase opposition will be induced in the induction coils 26 and 26', respectively. Such signals will be transmitted to the voltage divider 7 wherein the voltage differential therebetween will be detected. Thereafter, the detected differential will be fed to the radio-frequency amplifier 28 and from thence to the detector 30, amplifier 32 and indicator 34 whereby a signal constituting, for example, a measure of the difference in content of the nuclear species between the material in the lines 202 and 204 will be transmitted to the discriminator 8. If the signal is outside of a predetermined voltage range, a signal will be fed from the discriminator 8 to actuator 9 for regulating a process variable. Thus, it may be desired to regulate the treating process conducted in the treating zone 200 by regulating the flow of material in the line 206 and in this situation a signal from the actuator 9 passes by way of the lead 232 to the regulating means 240 with the electrically operated valve 242 in the line 206.

What is claimed is:
1. Apparatus for sampling a body of liquid and for analyzing the sample, said apparatus comprising nuclear magnetic resonance spectroscopic analysis means for processing nuclei of a nuclear species contained in a sample in resonance and for obtaining an analysis signal in response to precession of said nuclear species, sampling means fluidly interconnecting said analysis means with said body of liquid for delivery of a sample of said liquid to said analysis means, and regulating means interconnected with said sampling means and said analysis means for sequentially actuating and deactuating said sampling means and for thereafter actuating and de- actuating said analysis means at a predetermined time interval after deactuation of said sampling means.

2. Apparatus for periodic sampling and analysis of a body of liquid, said apparatus comprising electrically actuatable nuclear magnetic resonance spectroscopic analysis means for precessing nuclei of a nuclear species contained in a sample in resonance and for obtaining an analysis signal in response to resonance precession of said nuclear species, electrically actuatable sampling means fluidly interconnecting said analysis means with said body of liquid for periodically delivering a sample of said liquid to said analysis means, and electrically actuatable regulating means interconnected with said sampling means and said analysis means for sequentially actuating and deactuating said sampling means and for thereafter actuating and deactuating said analysis means at a predetermined time interval after deactuation of said sampling means.

3. In a nuclear magnetic resonance spectrometer, the improvement which comprises a sample holder in the spectrometer, a supply line for said sample holder fluidly connected therewith, a discharge line for said sample holder fluidly connected therewith, an electrically actuatable control member in each of said lines for sequentially initiating and terminating the flow of a sample of liquid material comprising a nuclear species therethrough, means for scanning the resonance band of said nuclear species at the sample holder location to precess nuclei of said nuclear species in resonance, detecting means for obtaining a scanning signal in response to resonance precession of said nuclear species, and control means interconnecting said detecting means and said control members for sequentially actuating and deactuating said control members and for thereafter actuating and deactuating said analysis means at a predetermined time interval after deactuation of said control members.

4. In a nuclear magnetic resonance spectrometer, the improvement which comprises a sample holder in the spectrometer, a supply line for said sample holder fluidly connected therewith, a discharge line for said sample holder fluidly connected therewith, an electrically actuatable control member in each of said lines for sequentially initiating and terminating flow of a sample of liquid material comprising a nuclear species therethrough, electrically actuatable means for scanning the resonance band of said nuclear species at the sample holder location to precess nuclei of said nuclear species in resonance, detecting means for obtaining an electrical scanning signal in response to resonance precession of said nuclear species, and control means electrically interconnecting said detecting means and said control members for sequentially actuating and deactuating said control members and thereafter for actuating and deactuating said detecting means at a predetermined time interval after deactuation of said control members.

5. In a nuclear magnetic resonance spectrometer, the improvement which comprises a sample holder in the spectrometer, a supply line for the sample holder fluidly connected therewith, a discharge line for said sample holder fluidly connected therewith, an electrically responsive control member in each of said lines for regulating the flow of a material comprising a nuclear species therethrough, means for precessing nuclei of said nuclear species in resonance, detecting means for obtaining a signal responsive to resonance precession of said nuclear species, and electrical timing control means interconnecting said precessing means and said electrically responsive control members, said electrical timing control means comprising switch means for activating said electrically responsive control members subsequent to the obtainance of a signal by said detecting means to initiate flow of said sample through said sample holder and to terminate flow after flushing of the same whereby another portion of said material is deposited in said sample holder, second switch means for activating said precessing means to establish a condition of readiness in response to termination of said flushing operation, and third switch means for thereafter activating said precessing means to obtain a signal.

6. Apparatus for sampling a plurality of liquid bodies and for analyzing the samples thus obtained, said apparatus comprising electrically actuatable nuclear magnetic resonance spectroscopic analysis means for precessing nuclei of a nuclear species contained in the sample in resonance and for obtaining an analysis signal in response to resonance precession of said nuclear species, a plurality of sampling means interconnecting said analysis means with said plurality of bodies of liquid to be sampled, and regulating means electrically interconnected with said analysis means and said plurality of sampling means for sequentially actuating and deactuating said plurality of actuating means and for actuating and deactuating said analysis means at a predetermined time interval after deactuation of said sampling means.

7. Apparatus for sampling a pair of liquid bodies and for analyzing samples thus obtained, said apparatus comprising nuclear magnetic resonance spectroscopic analysis means for precessing nuclei of a nuclear species contained in a sample in resonance and for obtaining an analysis signal in response to resonance precession of said nuclear species, first sampling means fluidly interconnecting said first body of liquid with said analysis means for delivering a sample of said first liquid thereto, second sampling means fluidly interconnecting said analysis means with said second body of liquid for bringing a sample of said second body of liquid to said analysis means, and electrical timing control means electrically interconnecting with said analysis means and said first and second sampling means, said electrical timing control means comprising first switch means for alternately actuating said first and second sampling means to alternately deliver samples of said first and second liquids to said analysis means, and second switch means for actuating said analysis means at a predetermined time interval after delivery of said liquids to said analysis means.

8. Apparatus for the periodic sampling and analysis of a body of a liquid material of a treating process and for the regulation of a treating variable of said process in response to analysis of the samples of said material, said apparatus comprising electrically actuatable nuclear magnetic resonance spectroscopic analysis means for precessing nuclei of a nuclear species contained in a sample in resonance and for obtaining an analysis signal in response to resonance precession of said nuclear species, electrically actuatable sampling means fluidly interconnecting said analysis means with said body for supplying a sample of said body to said analysis means for analysis in a liquid condition, regulating means electrically interconnected with said sampling means and said analysis means for periodically actuating said sampling means to periodically deliver samples to said analysis means and for initiating an analysis of each of said thus-delivered samples at a predetermined time interval after delivery thereof to said analysis means, electrically actuatable treating process control means, and process regulating means electrically interconnected with said analysis means and said treating control means for regulating said process control means in response to analysis signals obtained by analysis of said samples.

9. Apparatus for periodically simultaneously sampling a pair of liquid streams of a treating process, said streams having a common nuclear species, for simultaneously analyzing said samples and comparing said analyses with each other and for regulating a treating process variable of said process in response to said comparison, said apparatus comprising electrically actuatable nuclear magnetic resonance spectroscopic analysis means for precessing nuclei of a nuclear species in each of a pair of samples in precession under substantially identical conditions of precession to inductively obtain a signal for each said sample responsive to the resonance precession of the said nuclear species contained therein and for electrically comparing said inductive signals to obtain an electrical analysis signal responsive to said comparison, electrically actuatable sampling means separately fluidly interconnecting each of said pair of liquid streams with said analysis means for simultaneously supplying a sample of each of said streams to said analysis means, regulating means electrically interconnected with said sampling means and said analysis means for periodically actuating said sampling means to periodically deliver a pair of samples from said pair of streams to said analysis means and for initiating an analysis of each of said thus-delivered samples at a predetermined time after delivery thereof to said analysis means, electrically actuatable treating process control means, and process regulating means electrically interconnected with said treating process control means and said analysis means for regulating said process control means in response to said electrical analysis signals.

10. In a nuclear magnetic resonance spectrometer, the improvement which comprises a pair of sample holders in the spectrometer, electrically actuatable sampling means interconnecting each of said sample holders with a body of liquid material, means for precessing nuclei of said common nuclear species in each of said sample holders in resonance under substantially identical conditions of precession at each sample location, inductance means for detecting the resonance precessison of the precessing nuclei in each of said samples, signal generation and electrical capacitance detecting means for obtaining the differential between the signals generated by said inductance coils, and regulating means interconnecting said sampling means with said precession means for initiating an analysis of the thus-delivered samples at a predetermined time after the delivery of samples to said sample holders by said sampling means and for thereafter actuating said sampling means subsequent to the obtainance of said analysis signal to replace said thus analyzed samples with additional samples from said bodies of liquid.

11. Apparatus for sampling a body of liquid and for analyzing the sample, said apparatus comprising magnetic resonance spectroscopic analysis means for establishing gyromagnetic resonance precession in an atomic species contained in a sample and for obtaining an analysis signal in response to said resonance precession, sampling means fluidly interconnecting said analysis means with said body of liquid for delivery of a sample of said liquid to said analysis means, and regulating means interconnected with said sampling means and said analysis means for sequentially actuating and deactuating said sampling means and for thereafter actuating and deactuating said analysis means at a predetermined time interval after deactuation of said sampling means.

References Cited in the file of this patent

UNITED STATES PATENTS

| | | |
|---|---|---|
| 2,721,970 | Levinthal | Oct. 25, 1955 |
| 2,780,069 | Olcott | Feb. 5, 1957 |
| 2,829,363 | Obermaier et al. | Apr. 1, 1958 |

UNITED STATES PATENT OFFICE
CERTIFICATE OF CORRECTION

Patent No. 2,955,252                 October 4, 1960

Rollie B. Williams

It is hereby certified that error appears in the printed specification of the above numbered patent requiring correction and that the said Letters Patent should read as corrected below.

Column 10, line 67, for "processing" read -- precessing --.

Signed and sealed this 11th day of April 1961.

(SEAL)
Attest:

ERNEST W. SWIDER
Attesting Officer

ARTHUR W. CROCKER
Acting Commissioner of Patents